(12) United States Patent
Yoshida

(10) Patent No.: US 6,356,821 B1
(45) Date of Patent: Mar. 12, 2002

(54) ELECTRONIC CONTROL UNIT FOR VEHICLE HAVING REDUCED CIRCUIT SCALE

(75) Inventor: Naoki Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/644,654

(22) Filed: Aug. 24, 2000

(30) Foreign Application Priority Data

Aug. 27, 1999 (JP) ............................................ 11-240935

(51) Int. Cl.7 ............................. G05B 23/02; G05B 9/02
(52) U.S. Cl. ........................... 701/31; 714/24; 123/333; 123/478; 303/84.2; 303/115.4; 395/185.8
(58) Field of Search .............................. 701/31, 33, 34, 701/39, 43, 45, 115; 714/22, 55, 34; 303/115.4; 371/61

(56) References Cited

FOREIGN PATENT DOCUMENTS

| JP | 7-17337 | 1/1995 |
|---|---|---|
| JP | 7-40828 | 2/1995 |
| JP | 7-52784 | 2/1995 |
| JP | 8-248048 | 9/1996 |
| JP | 410161909 A | * 6/1998 |
| JP | 410224189 A | * 8/1998 |
| JP | 10326110 A | * 12/1998 |

* cited by examiner

Primary Examiner—William A. Cuchlinski, Jr.
Assistant Examiner—Tuan C To
(74) Attorney, Agent, or Firm—Whitham, Curtis & Christofferson, PC (57) ABSTRACT

An electronic control unit for a vehicle which receives a sensor signal as an input signal and provides an output signal for controlling operation of the vehicle. The electronic control unit comprising: a microcomputer having a first operating portion and a second operating portion both receiving the input signal commonly, and a self check portion which compares operation result of the first operating portion and the second operating portion and outputs a signal indicating abnormal condition when the operation result do not coincide with each other or when the first operating portion outputs abnormal output signal for a time equal to or longer than a predetermined time. The electronic control unit also comprises a safety control means which switches an output signal thereof from an output signal of the microcomputer to a safe side signal when the signal indicating abnormal condition from the self check portion continues for a time equal to or longer than a predetermined time.

16 Claims, 5 Drawing Sheets

PRIOR ART

FIG. 6

PRIOR ART

ELECTRONIC CONTROL UNIT FOR VEHICLE HAVING REDUCED CIRCUIT SCALE

FIELD OF THE INVENTION

The present invention relates generally to an electronic control unit (ECU) for a vehicle such as a car and the like, and more particularly to an electronic control unit of a safety control system for a vehicle having simple structure and high reliability.

BACKGROUND OF THE INVENTION

In the safety control system of a vehicle such as an antilock brake system (ABS) and the like, the electronic control unit (ECU) having one or more microcomputers therein is used. In the electronic control unit, results of operation including arithmetic operation by the microcomputers are used for controlling various actuators and the like, and thereby running performance, braking performance and the like are improved.

In such electronic control unit, when, for example, a microcomputer therein becomes out of order and outputs incorrect operation result or incorrect control data, there is a possibility that serious influence on an operation of the vehicle, such as abnormal driving, abnormal braking and the like occurs. Therefore, conventionally, the electronic control unit comprises a fail-safe mechanism for preventing occurrence of such abnormal control.

Figure 5:
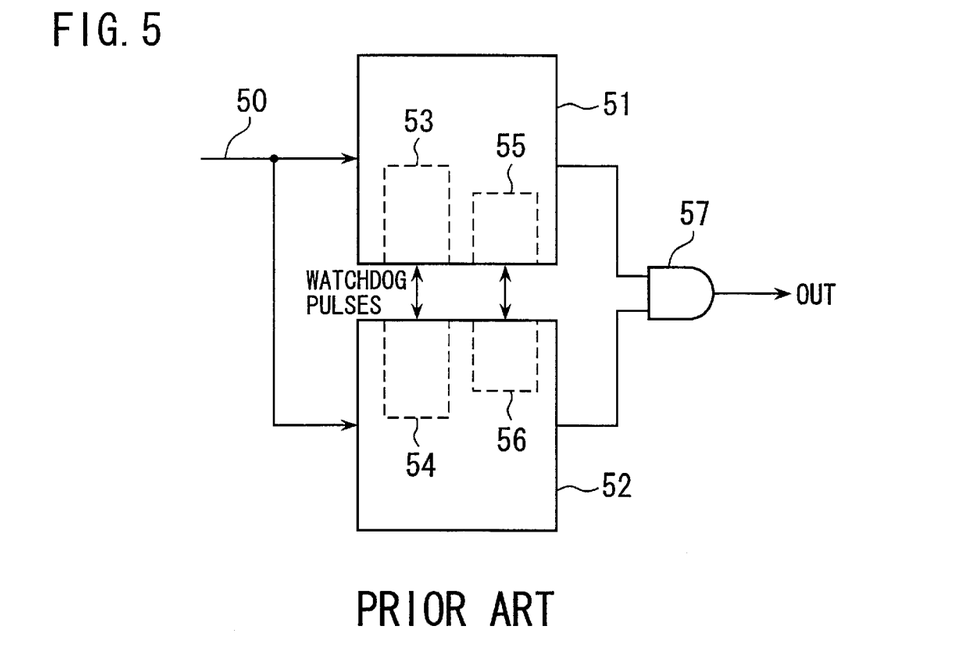
FIG. 5 is a schematic block circuit diagram showing a structure of a conventional electronic control unit having fail-safe function.

FIG. 5 schematically shows an example of a structure of a conventional electronic control unit. As shown in FIG. 5, the electronic control unit comprises a duplicate structure of a pair of microcomputers 51 and 52. An input signal 50 is commonly supplied to both of the microcomputers 51 and 52. The microcomputers 51 and 52 comprise watchdog pulse monitoring circuits 53 and 54, and mutual communication and monitoring circuits 55 and 56. Each of the watchdog pulse monitoring circuits 53 and 54 mutually monitors watchdog pulses outputted from the other microcomputer and decides if the watchdog pulses have a predetermined constant period, that is, if on-time and off-time of each watchdog pulse are respectively within predetermined time ranges. Thereby, each of the watchdog pulse monitoring circuits 53 and 54 monitors abnormal run of a CPU not shown in the drawing of the other microcomputer. Also, mutual communication and monitoring circuits 53 and 54 mutually send and receive the contents of random access memories (RAM's) (not shown in the drawing) which are included in the microcomputers 51 and 52 and which store result of operation of CPU's in the microcomputers 51 and 52, and compare the contents of the RAM's mutually to detect abnormal condition of the microcomputers. Also, there is provided a comparing circuit 57 which compares operation results outputted from both microcomputers 51 and 52. When the operation results do not coincide, it is determined that there is any fault in operational function and the like of a processing system including the microcomputers 51 and 52, and the comparing circuit 57 outputs a fault signal indicating that there is a fault condition in the processing system. In response to the output of the fault signal, operation of the processing system is halted if necessary, thereby securing reliability.

Figure 6:
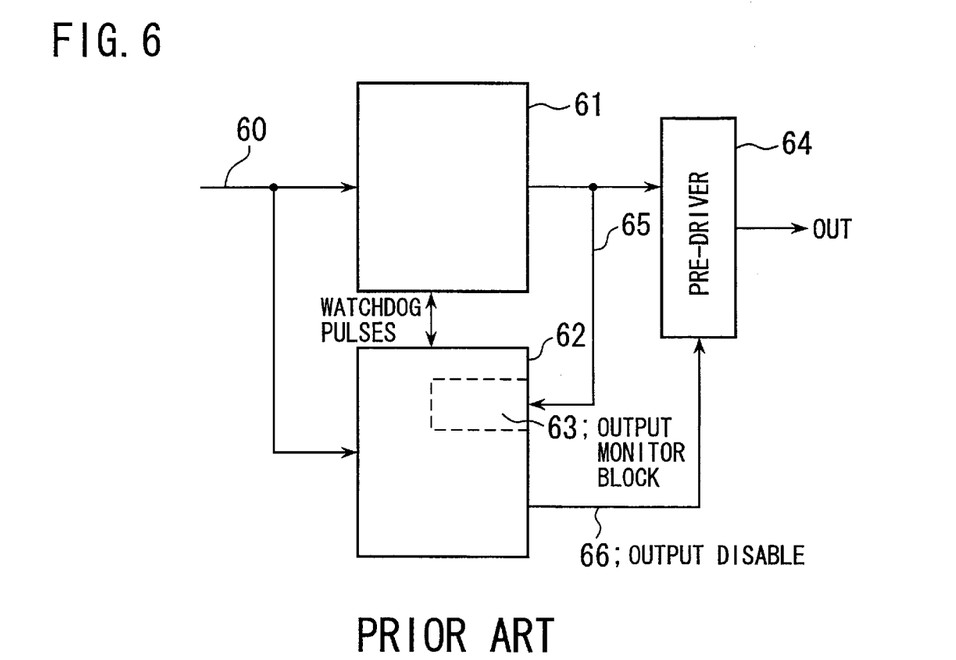
FIG. 6 is a schematic block circuit diagram showing a structure of a conventional electronic control unit having fail-safe function.

FIG. 6 illustrates another example of a structure of a conventional electronic control unit. The electronic control unit shown in FIG. 6 comprises a microcomputer 61 and a fail-safe microcomputer, that is, a sub-processing unit, 62. The microcomputer 61 accepts an input signal 60, performs necessary processing operation on the input signal 60, and supplies the result of the processing operation as an output signal 65. The fail-safe microcomputer 62 accepts the input signal 60 and performs simple processing operation on the input signal 60. The output of the microcomputer 61 is supplied via a pre-driver 64 to one or more actuators and the like not shown in the drawing as a control signal. The fail-safe microcomputer 62 comprises an output monitoring circuit or block 63 which monitors the condition of the output signal 65 from the microcomputer 61. When the output monitoring circuit 63 detects abnormal condition of the output signal 65, the output monitoring circuit 63 controls the pre-driver 64 such that the driver output from the pre-driver 64 is disabled or turned off.

In Japanese patent laid-open publication No. 7-52784, an anti-skid controller is disclosed as a vehicle safety apparatus. The anti-skid controller disclosed in this publication has a structure in which a wheel speed operation value obtained by an operation of a main processor itself is compared with a wheel speed operation value from a sub-processor received via a data transferring means are compared with each other to decide if the anti-skid controller operates normally. However, the technical idea of this prior art structure is basically the same as that of the duplicated structure including a plurality of microcomputers shown in FIG. 5, FIG. 6 and the like.

Also, in an anti-skid controller disclosed in Japanese patent laid-open publication No. 7-40828, there are provided a plurality of processors. In this anti-skid controller, operation results of these plurality of processors are compared and, based on the result of the comparison, malfunction is detected. However, the technical idea of this prior art structure is also basically the same as that of the duplicated structure including a plurality of microcomputers shown in FIG. 5, FIG. 6 and the like.

In this way, in each of the conventional electronic control units mentioned above, a duplicated structure comprising two microcomputers is used and, therefore, it is difficult to decrease cost and circuit scale of the electronic control unit.

This is because, a duplicated microcomputer system having fail-safe function requires relatively high performance microcomputers. Therefore, usually, each of the microcomputers is constituted of a 16 bit or 8 bit microcomputer which is relatively expensive among various electronic components of the electronic control unit. As a result thereof, when the duplicated microcomputer system is constituted of such 16 bit or 8 bit microcomputers, cost and size of the electronic control unit itself are also greatly influenced by the microcomputers.

Recently, a method of diagnosis has been improved, and an electronic control unit is proposed in which the diagnosis is performed by using 4 bit microcomputer. For example, Japanese patent laid-open publication No. 7-17337 discloses an electronic control unit having such structure. In the electronic control unit disclosed in this publication, to detect abnormal condition of a processing system thereof, a main CPU is constituted of a 16 bit microcomputer and a sub CPU is constituted of an 8 bit microcomputer, thereby a structure of the electronic control unit is simplified. However, even in this structure, it is necessary to use two microcomputers and it is difficult to decrease cost and circuit scale of the electronic control unit.

SUMMARY OF THE INVENTION

Therefore, it is an object of the present invention to obviate the disadvantages of the conventional electronic control unit for a vehicle.

It is another object of the present invention to provide an electronic control unit for a vehicle which has high reliability but which has small circuit scale and is less expensive.

It is still another object of the present invention to provide an electronic control unit for a vehicle which has high reliability but which has simple structure and small size.

It is still another object of the present invention to provide an electronic control unit for a vehicle in which diagnosis of a microcomputer in the electronic control unit can be performed by using a simple and low cost structure.

It is still another object of the present invention to provide an electronic control unit for a vehicle which has simple structure and low cost, but which can realize equal reliability with that of the conventional system having duplicated microcomputers.

According to an aspect of the present invention, there is provided an electronic control unit which receives an input signal from outside and performs data processing on the input signal to produce an output signal, the electronic control unit comprising: a microcomputer including a first operating portion and a second operating portion both receiving the input signal commonly, and a self check portion for comparing operation result of the first operating portion and the second operating portion and outputting a signal indicating abnormal condition when the operation result do not coincide with each other; and a safety control means which switches an output signal thereof from an output signal of the microcomputer to a safe side signal when the signal indicating abnormal condition from the self check portion continues for a time equal to or longer than a predetermined time.

In this case, it is preferable that the self check portion monitors an output signal from the first operating portion and outputs a signal indicating abnormal condition when the first operating portion outputs abnormal output signal for a time equal to or longer than a predetermined time.

It is also preferable that the self check portion comprises: a comparing portion which compares operation result of the first operating portion and the second operating portion; a monitoring portion which monitors the output of the first operating portion; and an output portion which outputs a signal indicating abnormal condition when the monitoring portion indicates that the first operating portion outputs abnormal output signal value for a time equal to or longer than a predetermined time, or when the comparing portion indicates that an error rate of operation result between the first operating portion and the second operating portion is higher than or equal to a predetermined value.

It is further preferable that the safety control means comprises: a fail-safe unit which receives an output signal of the first operating portion as an input thereof; and a measuring unit which measures a duration the signal indicating abnormal condition is outputted from the output portion, and which, when the signal indicating abnormal condition is outputted from the output portion for a time equal to or longer than a predetermined time, outputs a switching control signal for switching an output signal of the fail-safe signal from an output of the microcomputer to a safe side output signal.

It is advantageous that both the first operating portion and the second operating portion receive an output signal from a common wheel speed sensor.

It is also advantageous that the electronic control unit further comprises a watchdog pulse monitoring circuit which monitors a watchdog pulse signal outputted from the microcomputer and which generates a reset signal from resetting the microcomputer when periods of the watchdog pulse signal become abnormal for a time equal to or longer than a predetermined time.

According to another aspect of the present invention, there is provided an electronic control unit for a vehicle which receives a sensor signal as an input signal and provides an output signal for controlling operation of the vehicle, the electronic control unit comprising: a microcomputer having a first operating portion and a second operating portion both receiving the input signal commonly, and a self check portion which compares operation result of the first operation portion and the second operating portion and outputs a signal indicating abnormal condition when the operation result do not coincide with each other; and a safety control means which switches an output signal thereof from an output signal of the microcomputer to a safe side signal when the signal indicating abnormal condition from the self check portion continues for a time equal to or longer than a predetermined time.

In this case, it is preferable that the self check portion monitors an output signal from the first operating portion and outputs the signal indicating abnormal condition when the first operating portion outputs abnormal outputs signal for a time equal to or longer than a predetermined time.

It is also preferable that the self check portion comprises: a comparing portion which compares operation result of the first operating portion and the second operating portion; a monitoring portion which monitors the output of the first operating portion; and an output portion which outputs a signal indicating abnormal condition when the monitoring portion indicates that the first operating portion outputs abnormal output signal value for a time equal to or longer than a predetermined time, or when the comparing portion indicates that an error rate of operation result between the first operating portion and the second operating portion is higher than or equal to a predetermined value.

It is further preferable that the safety control means comprises: a fail-safe unit which receives an output signal of the first operating portion as an input thereof; and a measuring unit which measures a duration the signal indicating abnormal condition is outputted from the output portion, and which, when the signal indicating abnormal condition is outputted from the output portion for a time equal to or longer than a predetermined time, outputs a switching control signal for switching an output signal of the fail-safe signal from an output of the microcomputer to a safe side output signal.

It is advantageous that the electronic control unit further comprises a watchdog pulse monitoring circuit which monitors a watchdog pulse signal outputted from the microcomputer and which generates a reset signal for resetting the microcomputer when periods of the watchdog pulse signal become abnormal for a time equal to or longer than a predetermined time.

According to still another aspect of the present invention, there is provided an electronic control unit in a safety control system for a vehicle comprising: (a) a microcomputer having: a first operating portion and a second operating portion both receiving a signal inputted from a common sensor of the vehicle; a comparing portion which compares operation result of the first operating portion and the second operating portion; a monitoring portion which monitors an output signal outputted to an output port from the first operating portion and which outputs a signal indicating abnormal condition when the output signal from the output port has abnormal value for a time equal to or longer than a predetermined time; and an output portion which outputs a signal indicating abnormal condition when the monitoring portion outputs the signal indicating abnormal condition, or when the comparing portion indicates that an error rate of operation result between the first operating portion and the second operating portion is higher than or equal to a predetermined value; (b) a measuring unit which monitors the signal indicating abnormal condition outputted from the output portion of the microcomputer, and which, when the signal indicating abnormal condition is outputted from the output portion for a time equal to or longer than a predetermined time, outputs a switching control signal; and (c) a fail-safe unit which receives an output signal of the output port of the microcomputer as an input thereof, and which, when the switching control signal is outputted from the measuring unit, switches an output signal of the fail-safe unit from an output of the microcomputer to a safe side output signal.

In this case, it is preferable that the monitoring portion comprises a counter for counting a time during which an output signal from the output port has an abnormal value, the monitoring portion outputting a signal indicating abnormal condition when a count value of the counter has exceeded a predetermined value.

It is also preferable that the measuring unit comprises a counter for counting a time during which a signal indicating abnormal condition outputted from the output portion of the microcomputer is active, the measuring unit outputting the switching control signal when a count value of the counter has reached a value equal to or larger than a predetermined value.

It is further preferable that the electronic control unit further comprises a watchdog pulse monitoring circuit which monitors a watchdog pulse signal outputted from the microcomputer and which generates a reset signal for resetting the microcomputer when periods of the watchdog pulse signal become abnormal for a time equal to or longer than a predetermined time.

It is advantageous that the sensor comprises a wheel speed sensor, an output signal of the wheel speed sensor being wave-shaped by a wave-shaping circuit and inputted to the microcomputer, wherein the first operating portion comprises a first pulse width measuring portion which receives the wave-shaped output signal from the wheel speed sensor, and a first arithmetic logic unit for calculating a wheel speed from an output of the first pulse width measuring portion, and wherein the second operating portion comprises a second pulse width measuring portion which receives the wave-shaped output signal from the wheel speed sensor, and a second arithmetic logic unit for calculating a wheel speed from an output of the second pulse width measuring portion.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

Figure 1:
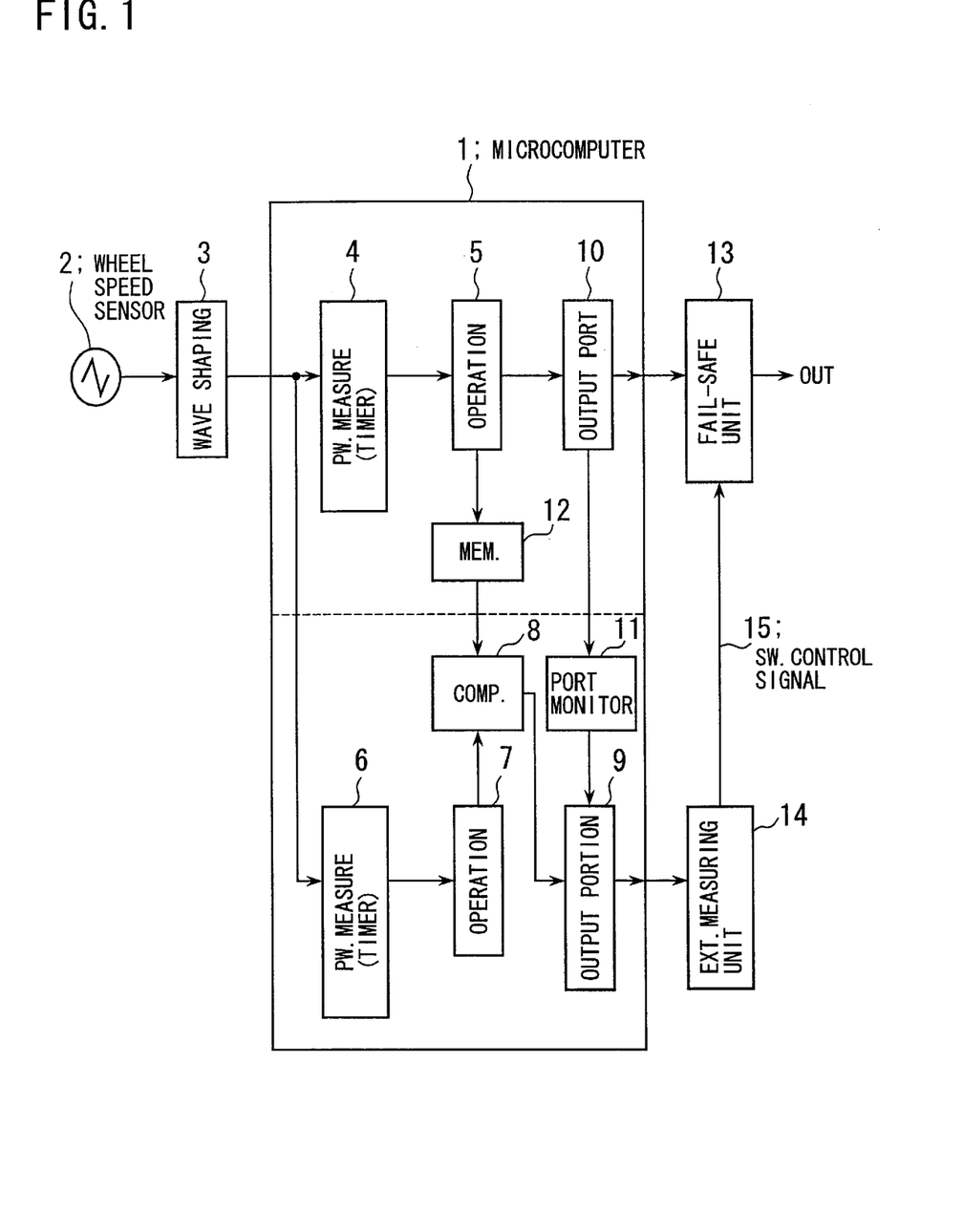
FIG. 1 is a schematic block circuit diagram showing a structure of a main portion of an electronic control unit according to an embodiment of the present invention.
Figure 4:
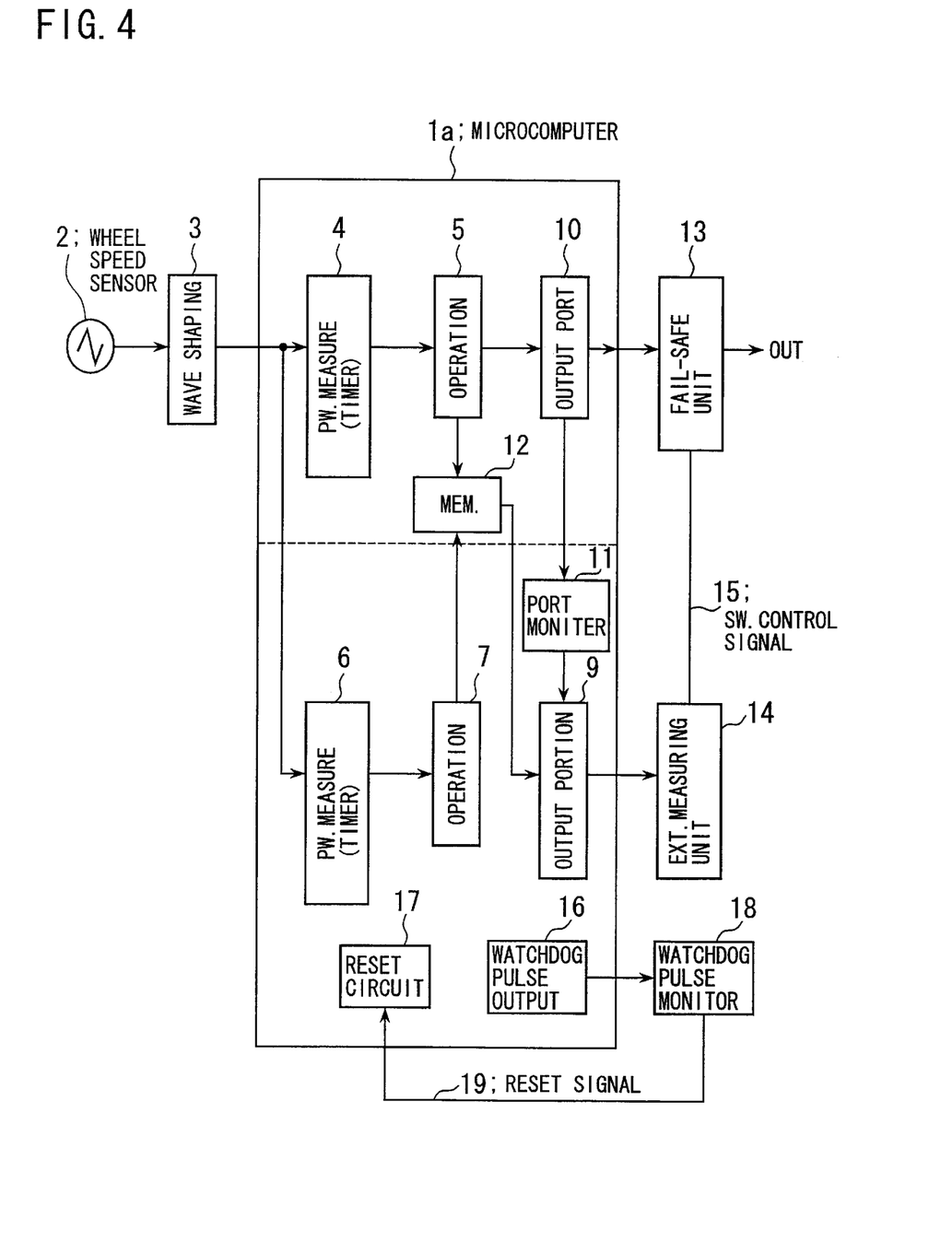
FIG. 4 is a schematic block circuit diagram showing a structure of a main portion of an electronic control unit according to another embodiment of the present invention.

First, with reference to FIG. 1 and FIG. 4, structure and operation of an electronic control unit according to the present invention will be briefly described.

In each of FIG. 1 and FIG. 4, there is shown a schematic structure of a main portion of an electronic control unit according to the present invention. In the electronic control unit of FIG. 1 or FIG. 4, the first operating means including a first pulse width measuring portion 4 and a first operating portion 5, and the second operating means including a second pulse width measuring portion 7 and a second operating portion 7 are provided parallel and receive a signal from a wheel speed sensor 2 via the wave shaping circuit 3. The comparing circuit 8 compares the results of operation of the first and second operating means and determines whether they coincide with each other or not. The port monitor portion 11 monitors an output signal of the output port 10 which outputs an output signal from the first operating means (4, 5) to outside. If an abnormal condition of the output signal from the output portion 10 lasts for more than a predetermined time, the port monitor portion 11 outputs a signal indicating abnormal condition. The output portion 9, which is also called a diagnosis portion or a second output portion, outputs a signal indicating abnormal condition when the rate of inconsistency in the comparing portion 8 is equal to or higher than a predetermined inconsistency rate or when the output portion 9 receives the signal indicating abnormal condition from the port monitor portion 11. The external measuring unit 14 monitors the output signal from the output portion 9 of the microcomputer 1, and, if the output signal from the output portion 9 indicates abnormal condition for a time equal to or longer than a predetermined time, the external measuring unit 14 outputs a switching control signal 15. The fail-safe unit 13 receives the output signal from the output port 10 of the microcomputer 1, and, if the switching control signal 15 is supplied thereto from the external measuring unit 14, the fail-safe unit 13 switches the output thereof into a fail-safe side signal, or a safe side signal.

It is possible to provide a counter in the port monitor portion 11, and to count by the counter a time period during which the output signal from the output port (first output portion) 10 indicates abnormal condition. In this case, the port monitor portion 11 can output a signal indicating abnormal condition if the count value of the counter exceeds a predetermined value.

Also, it is possible to provide a counter in the external measuring unit 14, and to count by the counter a time period during which the output signal from the output portion (second output portion) 9 indicates abnormal condition. In this case, the external measuring unit 14 can output the switching control signal 15 if the count value of the counter exceeds a predetermined value.

Further, as shown in FIG. 4, it is possible to provide a watchdog pulse signal monitoring unit 18 which monitors a watchdog pulse signal from a watchdog pulse output circuit 16 of the microcomputer. When periods of the watchdog pulse signal are abnormal for a predetermined time, the watchdog pulse signal monitoring unit 18 provides a reset signal 19 to the microcomputer to start a reset sequence of the microcomputer.

In the present invention, malfunction or fault of the fundamental function of a microcomputer, such as input/output function, time measuring function, operating function and the like is detected by the microcomputer itself and thereby securing reliability of the microcomputer, an electronic control unit and a system including the electronic control unit.

Figure 2:
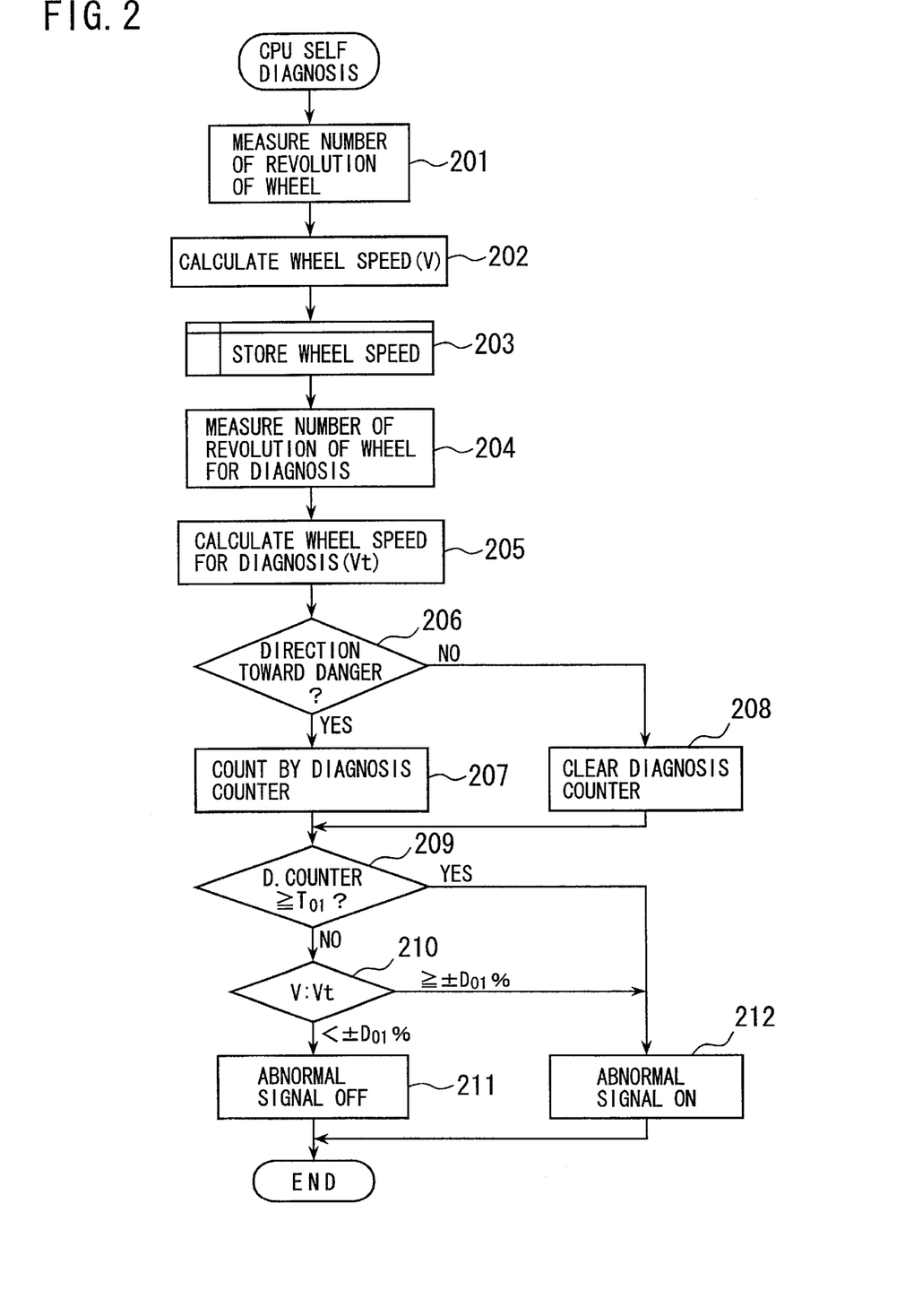
FIG. 2 is a flow chart showing a processing procedure for self-diagnosis of a microcomputer in the electronic control unit shown in FIG. 1.
Figure 3:
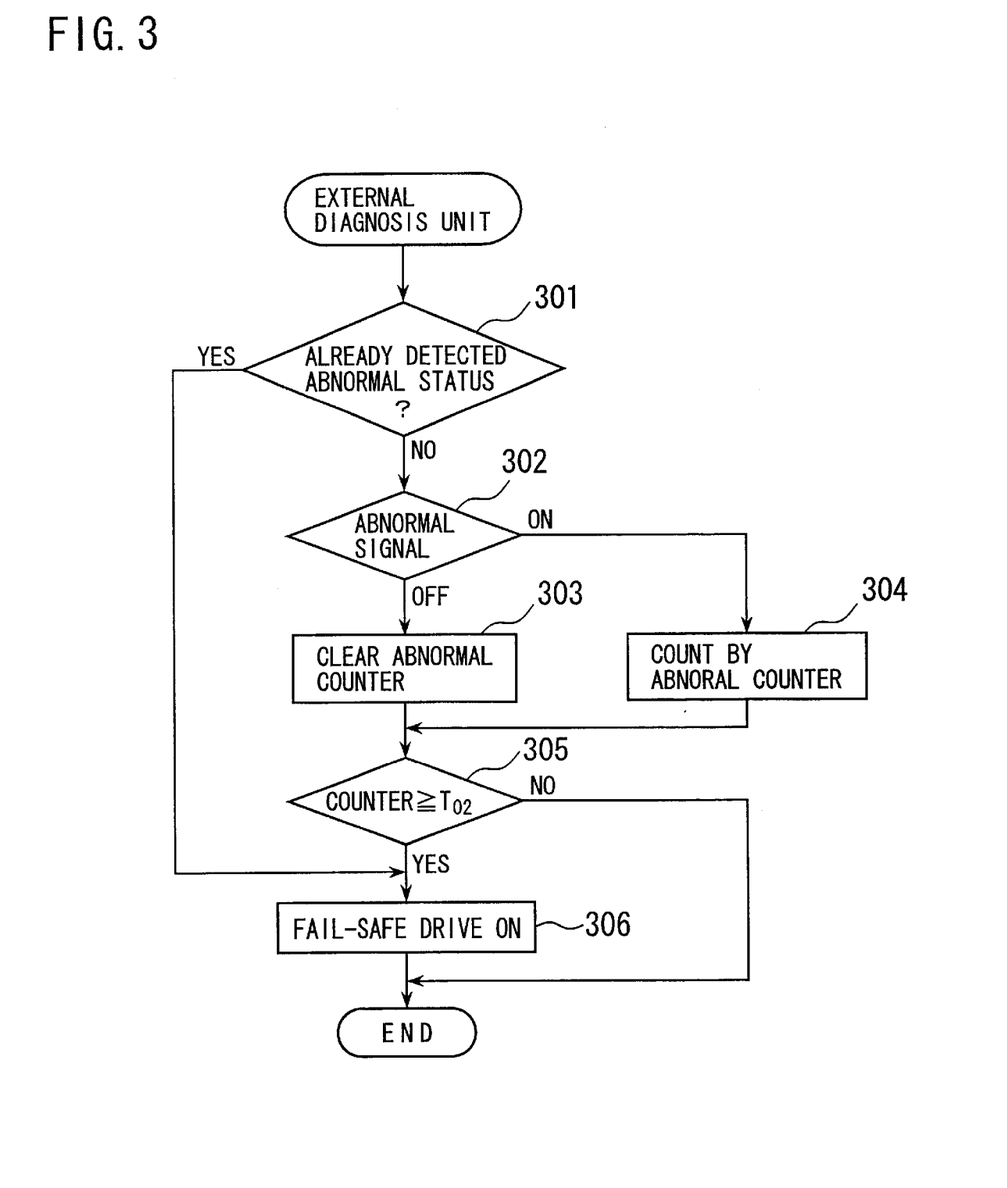
FIG. 3 is a flow chart showing a processing procedure for fail-safe operation in the electronic control unit shown in FIG. 1.

Now, with reference to FIG. 1, FIG. 2 and FIG. 3, a detailed description will be made on a main portion, that is, a microcomputer portion, of the electronic control unit according to a first embodiment of the present invention. FIG. 1 is a schematic block circuit diagram showing a structure of the main portion of the electronic control unit according to the first embodiment. FIG. 2 and FIG. 3 are flow charts showing an operation of the electronic control unit shown in FIG. 1.

The electronic control unit of FIG. 1 is used in a vehicle such as a car and the like, and comprises a microcomputer 1, a wave shaping circuit 3, a fail-safe unit 13, and an external measuring unit 14. The microcomputer 1 comprises a first pulse width measuring portion 4, a first operating portion 5, and a first output portion or an output port 10. The first pulse width measuring portion 4 and the first operating portion 5 constitute a first operating means. The microcomputer 1 also comprises a second pulse width measuring portion 6, a second operating portion 7, and a second output portion or an output portion 9. The second pulse width measuring portion 6 and the second operating portion 7 constitute a second operating means. The microcomputer 1 further comprises a memory unit 12, a comparing portion 8, and a port monitor portion 11. The microcomputer 1 comprises the above-mentioned components integrated in one integrated circuit chip.

In the electronic control unit shown in FIG. 1, a wheel speed sensor 2 disposed, for example, close to a wheel of a vehicle not shown in the drawing generates a wheel speed signal. The wheel speed signal is inputted to the microcomputer 1 via the wave shaping circuit 3. The first pulse width measuring portion 4 measures a pulse width, a pulse period or other necessary parameters of the wheel speed signal inputted thereto via the wave shaping circuit 3. The first operating portion 5 includes or comprises an arithmetic logic unit (ALU) and calculates a wheel speed based on the result of measurement by the first pulse width measuring portion 4, and stores obtained wheel speed data in the memory unit 12. In this case, the first pulse width measuring portion 4 detects edges of the wheel speed signal outputted from the wave shaping circuit 3, and measures the pulse width and the like by counting a time period between the edges by using a timer.

The electronic control unit shown in FIG. 1 comprises a second pulse width measuring portion 6 which receives as an input thereof the output signal of the wave shaping circuit 3. As mentioned above, the output signal of the wave shaping circuit 3 is also inputted into the first pulse width measuring portion 4. The second pulse width measuring portion 6 measures a pulse width, a pulse period or other necessary parameters of the wheel speed signal inputted thereto via the wave shaping circuit 3. The electronic control unit shown in FIG. 1 further comprises a second operating portion 7 which includes or comprises an arithmetic logic unit (ALU) and which calculates a wheel speed based on the result of measurement from the second pulse width measuring portion 6. The wheel speed data obtained in the first operating portion 5 and the second operating portion 7 are compared with each other in the comparing portion 8, and, when the wheel speed data do not coincide with each other, the output portion 9 outputs a signal indicating abnormal condition to an external circuit, that is, to the external measuring unit 14, based on the output of the comparing circuit 8.

In the microcomputer 1 shown in FIG. 1, the first pulse width measuring portion 4 and the first operating portion 5 may be the same as those provided in a conventional microcomputer. The second pulse width measuring portion 6, the second operating portion 7, the comparing portion 8, the port monitor portion 11, the output portion 9 and the like are newly provided according to the present invention.

The port monitor portion 11 monitors the condition of the output signal of the output port 10, and, when the output signal showing a direction (tendency) toward abnormal operation of a vehicle is outputted from the output portion 10 for a time equal to or longer than a predetermined time, the port monitor portion 11 notifies the output portion 9 of abnormal condition. In response thereto, the output portion 9 outputs a signal indicating abnormal condition. For example, when the electronic control unit shown in FIG. 1 is used in an antilock brake system (ABS), if the direction of performing control by the ABS continues for more than a predetermined time period, that is, if the direction of suppressing braking operation continues for more than a predetermined time period, the port monitor portion 11 notifies abnormal condition to the output portion 9.

In the comparing portion 8, operation result A of the first operating portion 5 and operation result B of the second operating portion 7 are compared. If an inconsistency, that is, an error rate, between the operation result A and the operation result B is equal to or larger than a predetermined value $D_{01}$, that is, if $100 \times (A-B)/A \geq D_{01}$, the output portion 9 generates a signal indicating abnormal condition. Also, as mentioned above, when the output signal showing a direction toward abnormal operation of a vehicle is outputted from the output portion 10 for a time equal to or longer than a predetermined time $T_{01}$, the port monitor portion 11 notifies abnormal condition to the output portion 9, and in response thereto, the output portion 9 outputs a signal indicating abnormal condition. Therefore, the output portion 9 generates the signal indicating abnormal condition to outside, when the result of comparison by the comparing portion 8 shows abnormal condition or when the port monitor portion 11 notifies abnormal condition to the output portion 9, or when both the comparing portion 8 and the port monitor portion 11 show or notify abnormal condition to the output portion 9. Thus, the output portion 9 functions as a portion for outputting diagnosis result.

The external measuring unit 14 receives, as an input, the signal indicating abnormal condition from the output portion 9 of the microcomputer 1. The external measuring unit 14 monitors the signal indicating abnormal condition outputted from the output portion 9, and, when the signal indicating abnormal condition continues to be active or on condition for a time period equal to or longer than a predetermined time period $T_{02}$, the external measuring unit 14 determines that the microcomputer 1 is in abnormal condition and outputs a switching control signal 15 for activating the fail-safe unit 13 thereto. In response to receiving the switching control signal 15, the fail-safe unit 13 drives or changes the output signal of the microcomputer 1 toward the safe operation side.

Now, with reference to flow charts of FIG. 2 and FIG. 3, a detailed explanation will be made on an operation of the structure of FIG. 1 according to the present embodiment. FIG. 2 is a flow chart showing a processing procedure for self-diagnosis of a microcomputer 1 in the electronic control unit shown in FIG. 1. FIG. 3 is a flow chart showing a processing procedure for fail-safe operation of the external measuring unit 14 in the electronic control unit shown in FIG. 1.

First, the microcomputer 1 receives a wheel speed signal from the wheel speed sensor 2 in accordance with the rotation of a wheel when, for example, a vehicle travels. In step 201 of FIG. 2, the first pulse width measuring portion 4 measures the number of revolution of a wheel, for example, from the number of pulses of the wheel speed signal during a predetermined time and from a pulse period of the wheel speed signal. In step 202, the first operating portion 5 calculates a wheel speed (V) based on the number of revolution of the wheel, and the calculated wheel speed data is stored in the memory unit 12 in step 203.

At the same time, in step 204, the second pulse width measuring portion 6 measures the number of revolution of the wheel from the wheel speed signal inputted from the wheel speed sensor 2 via the wave shaping circuit 3. Also, in step 205, the second operating portion 7 calculates wheel speed (Vt) for diagnosis based on the calculated number of revolution of the wheel measured by the second pulse width measuring portion 6.

In step 206, the port monitor portion 11 monitors the status of the output port 10 and decides if the output of the output port 10 shows a direction toward dangerous condition of the vehicle, that is, if the output of the output port 10 has a status which should not last for more than a predetermined time. If, in step 206, the output signal of the output port 10 has the direction toward dangerous condition, a diagnosis counter provided, for example, in the port monitor portion 11 and not shown in the drawing is counted up in step 207. On the other hand if, in step 206, the output signal of the output port 10 does not have the direction toward dangerous condition, the diagnosis counter is cleared in step 208.

In step 209, the output portion 9 determines if the count number of the diagnosis counter reaches a predetermined count number which is equal to or larger than a number corresponding to a predetermined time $T_{O1}$. If, in step 209, it is determined that the count number of the diagnosis counter has reached the predetermined count number, the output portion 9 activates or turns on the signal indicating abnormal condition in step 212. On the other hand, if, in step 209, it is determined that the count number of the diagnosis counter has not reached the predetermined count number, process continues to step 210. In step 210, the comparing portion 8 compares the operation result (Vt) of the second operating portion 7 with the operation result (V) stored in the memory unit 12, and if the inconsistency between these operation results is equal to or larger than $D_{O1}$ percent, the output portion 9 activates or turns on the signal indicating abnormal condition in step 212. Otherwise, if the inconsistency between these operation results is smaller than $D_{O1}$ percent, the output portion 9 deactivates or turns off the signal indicating abnormal condition in step 211.

Next, with reference to FIG. 3, the external measuring unit 14 monitors the signal indicating abnormal condition outputted from the output portion 9 of the microcomputer 1. First, it is decided if the external measuring unit 14 has already detected abnormal status of the microcomputer 1, that is, if the signal indicating abnormal condition from the output portion 9 has already continued for a predetermined time or more. If the external measuring unit 14 has already detected abnormal status of the microcomputer 1, the process continues to step 306. If the external measuring unit 14 has not yet detected the abnormal status of the microcomputer 1, the external measuring unit 14 decides if the signal indicating abnormal condition outputted from the output portion 9 is active or in on-condition in step 302. If, in step 302, the signal indicating abnormal condition outputted from the output portion 9 is active or in on-condition, an abnormal counter provided, for example, in the external measuring unit 14 and not shown in the drawing is counted up in step 304. On the other hand if, in step 302, the signal indicating abnormal condition outputted from the output portion 9 is not active or in off-condition, the abnormal counter is cleared in step 303.

Then, in step 305, the external measuring unit 14 decides if the count number of the abnormal counter has reached a predetermined count number which is equal to or larger than a number corresponding to a predetermined time $T_{O2}$. If, in step 305, it is determined that the count number of the abnormal counter has reached the predetermined count number, the process continues to step 306. In step 306, the external measuring unit 14 activates or turns on the switching control signal 15 which is delivered to the fail-safe unit 13 to inform abnormal status thereto. Upon receipt of the switching control signal 15, the fail-safe unit 13 changes or drives the output signal thereof toward the safe side. If, in step 305, it is determined that the count number of the abnormal counter has not reached the predetermined count number, process exits from this procedure.

FIG. 4 is a schematic block circuit diagram showing a structure of the main portion of the electronic control unit according to the second embodiment of the present invention. In FIG. 4, the same components as those in FIG. 1 are designated by the same reference numerals and description thereof is omitted here.

In the electronic control unit shown in FIG. 4, a microcomputer 1a comprises a watchdog pulse output circuit 16 and a reset circuit 17, in addition to the components of the microcomputer 1 shown in FIG. 1. Also, there is provided a watchdog pulse monitoring circuit 18 external to the microcomputer 1a. Other portions of FIG. 4 are substantially the same as those of FIG. 1. The watchdog pulse output circuit 16 is a circuit for outputting a watchdog pulse of the microcomputer 1a to outside. The reset circuit 17 may be a standard reset circuit provided in a conventional microcomputer. The reset circuit 17 is a circuit for controlling the microcomputer 1a such that predetermined internal circuit portions in the microcomputer 1a are reset when a reset signal is inputted to the reset circuit 17 from outside. As an input signal of the reset circuit 17, it is also possible to use a logically ORed signal of an external reset signal supplied to a reset terminal of the conventional microcomputer and a reset signal 19 from the watchdog pulse monitoring circuit 18. The watchdog pulse monitoring circuit 18 is a circuit for monitoring from outside the watchdog pulse signal outputted from the microcomputer 1a.

In the electronic control unit according to the second embodiment of the present invention, the watchdog pulse signal outputted from the watchdog pulse output circuit 16 of the microcomputer 1a is monitored by the watchdog pulse monitoring circuit 18 and, thereby, condition of a clock signal or clock signals supplied to the microcomputer 1a is monitored. That is, the watchdog pulse monitoring circuit 18 monitors the watchdog pulse signal outputted from the microcomputer 1a, and checks if a period of the watchdog pulse signal is within a predetermined range. When the watchdog pulse monitoring circuit 18 detects that a condition of abnormal period of the watchdog pulse signal lasts for a time equal to or longer than a predetermined time, the watchdog pulse monitoring circuit 18 generates a reset signal 19 supplied to the microcomputer 1a.

The reset signal 19 is inputted to the reset circuit 17 of the microcomputer 1a, and thereby a reset sequence of the microcomputer 1a is initiated. In the reset sequence, the microcomputer 1a executes an initialization program from a predetermined address of a memory not shown in the drawing and thereby the microcomputer 1a is restarted, for example.

In the structure of the first embodiment shown in FIG. 1, the microcomputer 1 comprises self-diagnosis function within itself, and when abnormal status is detected, the fail-safe unit 13 is activated. On the other hand, in structure of the second embodiment described with reference to FIG. 4, the watchdog pulses from the microcomputer 1a are monitored from outside to detect runaway of the microcomputer 1a, in addition to the features of the first embodiment. Therefore, it is possible to further enhance safeness of operation of the electronic control unit and a vehicle using such electronic control unit.

In summary, according to the present invention, the following advantageous effects are obtained.

First, according to the present invention, it is possible to perform diagnosis of operating function and the like of a microcomputer by itself, and thereby to reduce cost and circuit scale of an electronic control unit including the microcomputer.

This is because, in the present invention, there are provided an additional operating portion, a comparing portion and the like which are independent from a usual operating portion and the like and which are used for diagnosis within the same one microcomputer chip, and result of operation of both operating portions are mutually compared and monitored to detect abnormal condition of the microcomputer. Therefore, it is possible to obtain reliability of an electronic control unit which is equivalent to that of the conventional electronic control unit, without using a separate and expensive fail-safe microcomputer.

Second, according to the present invention, it is possible to reduce the size of an electronic control unit itself and to simplify the structure of the electronic control unit.

This is because, in the present invention, output status based on operation of the microcomputer itself is monitored to detect abnormal condition by the functional blocks which are independent from the usual functional blocks and which are provided in the microcomputer. Therefore, it is possible to realize high reliability of an electronic control unit by using one microcomputer.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. An electronic control unit which receives an input signal from outside and performs data processing on said input signal to produce an output signal, said electronic control unit comprising:

a microcomputer including a first operating portion and a second operating portion both receiving said input signal commonly, and a self check portion for comparing operation result of said first operating portion and said second operating portion and outputting a signal indicating abnormal condition when said operation result do not coincide with each other; and a safety control means which switches an output signal thereof from an output signal of said microcomputer to a safe side signal when said signal indicating abnormal condition from said self check portion continues for a time equal to or longer than a predetermined time.

2. An electronic control unit as set forth in claim 1, wherein said self check portion monitors an output signal from said first operating portion and outputs a signal indicating abnormal condition when said first operating portion outputs abnormal output signal for a time equal to or longer than a predetermined time.

3. An electronic control unit as set forth in claim 1, wherein said self check portion comprises:

a comparing portion which compares operation result of said first operating portion and said second operating portion;

a monitoring portion which monitors said output of said first operating portion; and an output portion which outputs a signal indicating abnormal condition when said monitoring portion indicates that said first operating portion outputs abnormal output signal value for a time equal to or longer than a predetermined time, or when said comparing portion indicates that an error rate of operation result between said first operating portion and said second operating portion is higher than or equal to a predetermined value.

4. An electronic control unit as set forth in claim 3, wherein said safety control means comprises:

a fail-safe unit which receives an output signal of said first operating portion as an input thereof; and a measuring unit which measures a duration said signal indicating abnormal condition is outputted from said output portion, and which, when said signal indicating abnormal condition is outputted from said output portion for a time equal to or longer than a predetermined time, outputs a switching control signal for switching an output signal of said fail-safe signal from an output of said microcomputer to a safe side output signal.

5. An electronic control unit as set forth in claim 1, wherein both said first operating portion and said second operating portion receive an output signal from a common wheel speed sensor.

6. An electronic control unit as set forth in claim 1, further comprising a watchdog pulse monitoring circuit which monitors a watchdog pulse signal outputted from said microcomputer and which generates a reset signal for resetting said microcomputer when periods of said watchdog pulse signal become abnormal for a time equal to or longer than a predetermined time.

7. An electronic control unit for a vehicle which receives a sensor signal as an input signal and provides an output signal for controlling operation of said vehicle, said electronic control unit comprising:

a microcomputer having a first operating portion and a second operating portion both receiving said input signal commonly, and a self check portion which compares operation result of said first operating portion and said second operating portion and outputs a signal indicating abnormal condition when said operation result to not coincide with each other; and a safety control means which switches an output signal thereof from an output signal of said microcomputer to a safe side signal when said signal indicating abnormal condition from said self check portion continues for a time equal to or longer than a predetermined time.

8. An electronic control unit as set forth in claim 7, wherein said self check portion monitors an output signal from said first operating portion and outputs said signal indicating abnormal condition when said first operating portion outputs abnormal output signal for a time equal to or longer than a predetermined time.

9. An electronic control unit as set forth in claim 7, wherein said self check portion comprises:

a comparing portion which compares operation result of said first operating portion and said second operating portion;

a monitoring portion which monitors said output of said first operating portion; and an output portion which outputs a signal indicating abnormal condition when said monitoring portion indicates that said first operating portion outputs abnormal output signal value for a time equal to or longer than a predetermined time, or when said comparing portion indicates that an error rate of operation result between said first operating portion and said second operating portion is higher than or equal to a predetermined value.

10. An electronic control unit as set forth in claim 9, wherein said safety control means comprises:

a fail-safe unit which receives an output signal of said first operating portion as an input thereof; and a measuring unit which measures a duration said signal indicating abnormal condition is outputted from said output portion, and which, when said signal indicating abnormal condition is outputted from said output portion for a time equal to or longer than a predetermined time, outputs a switching control signal for switching an output signal of said fail-safe signal from an output of said microcomputer to a safe side output signal.

11. An electronic control unit as set forth in claim 7, further comprising a watchdog pulse monitoring circuit which monitors a watchdog pulse signal outputted from said microcomputer and which generates a reset signal for resetting said microcomputer when periods of said watchdog pulse signal become abnormal for a time equal to or longer than a predetermined time.

12. An electronic control unit in a safety control system for a vehicle comprising:

(a) a microcomputer having:

a first operating portion and a second operating portion both receiving a signal inputted from a common sensor of said vehicle;

a comparing portion which compares operation result of said first operating portion and said second operating portion;

a monitoring portion which monitors an output signal outputted to an output port from said first operating portion and which outputs a signal indicating abnormal condition when said output signal from said output port has abnormal value for a time equal to or longer than a predetermined time; and an output portion which outputs a signal indicating abnormal condition when said monitoring portion outputs said signal indicating abnormal condition, or when said comparing portion indicates that an error rate of operation result between said first operating portion and said second operating portion is higher than or equal to a predetermined value;

(b) a measuring unit which monitors said signal indicating abnormal condition outputted from said output portion of said microcomputer, and which, when said signal indicating abnormal condition is outputted from said output portion for a time equal to or longer than a predetermined time, outputs a switching control signal; and (c) a fail-safe unit which receives an output signal of said output port of said microcomputer as an input thereof, and which, when said switching control signal is outputted from said measuring unit, switches an output signal of said fail-safe unit from an output of said microcomputer to a safe side output signal.

13. An electronic control unit as set forth in claim 12, wherein said monitoring portion comprises a counter for counting a time during which an output signal from said output port has an abnormal value, said monitoring portion outputting a signal indicating abnormal condition when a count value of said counter has exceeded a predetermined value.

14. An electronic control unit as set forth in claim 12, wherein said measuring unit comprises a counter for counting a time during which a signal indicating abnormal condition outputted from said output portion of said microcomputer is active, said measuring unit outputting said switching control signal when a count value of said counter has reached a value equal to or larger than a predetermined value.

15. An electronic control unit as set forth in claim 12, further comprising a watchdog pulse monitoring circuit which monitors a watchdog pulse signal outputted from said microcomputer and which generates a reset signal for resetting said microcomputer when periods of said watchdog pulse signal become abnormal for a time equal to or longer than a predetermined time.

16. An electronic control unit as set forth in claim 12, wherein said sensor comprises a wheel speed sensor, an output signal of said wheel speed sensor being wave-shaped by a wave-shaping circuit and inputted to said microcomputer, wherein said first operating portion comprises a first pulse width measuring portion which receives said wave-shaped output signal from said wheel speed sensor, and a first arithmetic logic unit for calculating a wheel speed from an output of said first pulse width measuring portion, and wherein said second operating portion comprises a second pulse width measuring portion which receives said wave-shaped output signal from said wheel speed sensor, and a second arithmetic logic unit for calculating a wheel speed from an output of said second pulse width measuring portion.

* * * * *